United States Patent
Lee et al.

(10) Patent No.: US 10,999,819 B2
(45) Date of Patent: May 4, 2021

(54) METHOD AND APPARATUS TO SUPPORT MOBILITY IN LWA

(71) Applicant: LG Electronics Inc., Seoul (KR)

(72) Inventors: Ki-Dong Lee, San Diego, CA (US);
Sang Gook Kim, San Diego, CA (US)

(73) Assignee: LG Electronics Inc., Seoul (KR)

(*) Notice: Subject to any disclaimer, the term of this patent is extended or adjusted under 35 U.S.C. 154(b) by 16 days.

(21) Appl. No.: 16/606,541

(22) PCT Filed: Apr. 20, 2018

(86) PCT No.: PCT/KR2018/004614
§ 371 (c)(1),
(2) Date: Oct. 18, 2019

(87) PCT Pub. No.: WO2018/194420
PCT Pub. Date: Oct. 25, 2018

(65) Prior Publication Data
US 2020/0100212 A1    Mar. 26, 2020

Related U.S. Application Data

(60) Provisional application No. 62/487,984, filed on Apr. 20, 2017.

(51) Int. Cl.
*H04W 68/08* (2009.01)
*H04W 52/02* (2009.01)
(Continued)

(52) U.S. Cl.
CPC ....... *H04W 68/08* (2013.01); *H04W 52/0229* (2013.01); *H04W 88/06* (2013.01); *H04W 92/12* (2013.01); *H04W 92/14* (2013.01)

(58) Field of Classification Search
CPC . H04W 68/08; H04W 52/0229; H04W 88/06; H04W 92/12; H04W 92/14; Y02D 30/70
See application file for complete search history.

(56) References Cited

U.S. PATENT DOCUMENTS

| 8,929,926 B2* | 1/2015 | Ji | H04W 68/00 |
| | | | 455/458 |
| 9,504,013 B2* | 11/2016 | Ahluwalia | H04W 68/04 |
| (Continued) | | | |

FOREIGN PATENT DOCUMENTS

| GB | 2555784 A | * | 5/2018 | | H04W 68/005 |
| WO | WO-2017006265 A1 | * | 1/2017 | | H04W 68/08 |
| (Continued) | | | | | |

OTHER PUBLICATIONS

Nokia, Alcatel-Lucent Shanghai Bell, "Inter-eNB mobility with LWA active," R3-170356, 3GPP TSG-RAN Meeting #95, Athens, Greece, EU, dated Feb. 13-17, 2017, 3 pages.

(Continued)

*Primary Examiner* — Robert C Scheibel
(74) *Attorney, Agent, or Firm* — Fish & Richardson P.C.

(57) ABSTRACT

The present invention is directed to a method and an apparatus for use in a cellular communication system. Specifically, the present invention is directed to a method comprising: transmitting, to one of WLAN Terminations (WTs), a first indication to wake up WLAN module of the UE; if no response for the first indication is received from the one of WTs during a first time duration, transmitting, to all of the WTs, a second indication to wake up the WLAN module of the UE; and if no response for the second indication is received from any of the WTs during a second time duration, transmitting, to a mobility management entity (MME), a third indication related with absence of the UE, and an apparatus therefore.

10 Claims, 13 Drawing Sheets

(51) Int. Cl.
*H04W 88/06* (2009.01)
*H04W 92/12* (2009.01)
*H04W 92/14* (2009.01)

(56) References Cited

U.S. PATENT DOCUMENTS

2008/0254814 A1* 10/2008 Harris ................. H04W 68/06
  455/458
2015/0327112 A1* 11/2015 Kant ................. H04W 28/0226
  370/230
2016/0337485 A1  11/2016 Nuggehalli et al.

FOREIGN PATENT DOCUMENTS

WO  WO2017034605  3/2017
WO  WO-2017111788 A1 *  6/2017  ........ H04W 52/0216

OTHER PUBLICATIONS

Park et al., "Low-Power Wake-Up Receiver (LP-WUR) for 802.11," IEEE 802.11-15/1307r1, dated Nov. 10, 2015, 19 pages.
PCT International Search Report and Written Opinion in International Application No. PCT/KR2018/004614, dated Jul. 23, 2018, 9 pages.
Qualcomm Incorporated, "LTE mobility without WT change," R3-161362, 3GPP TSG-RAN3 Meeting #92, Nanjing, China, dated May 23-27, 2016, 4 pages.

* cited by examiner

[Fig. 1]
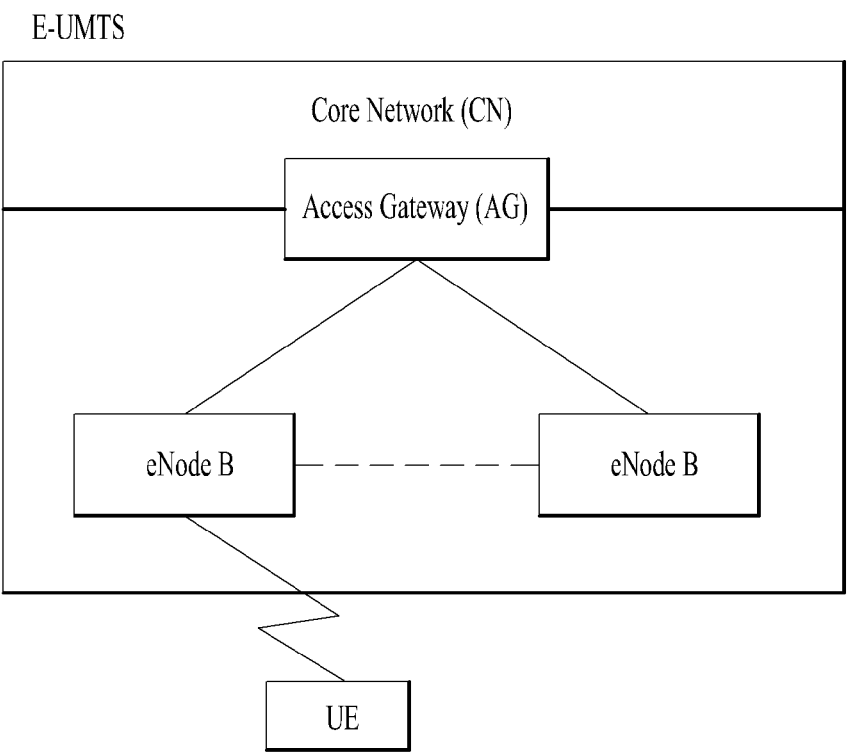

[Fig. 2A]
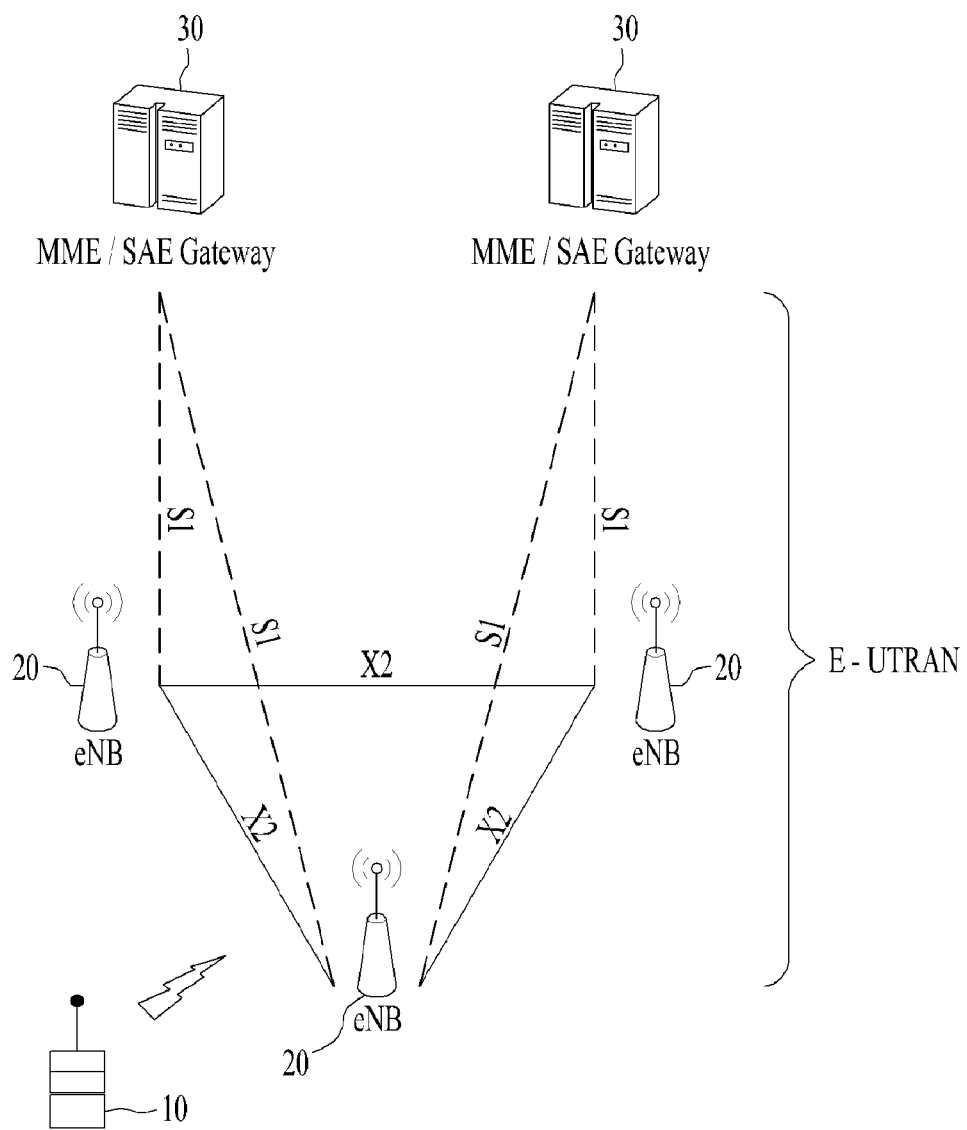

[Fig. 2B]
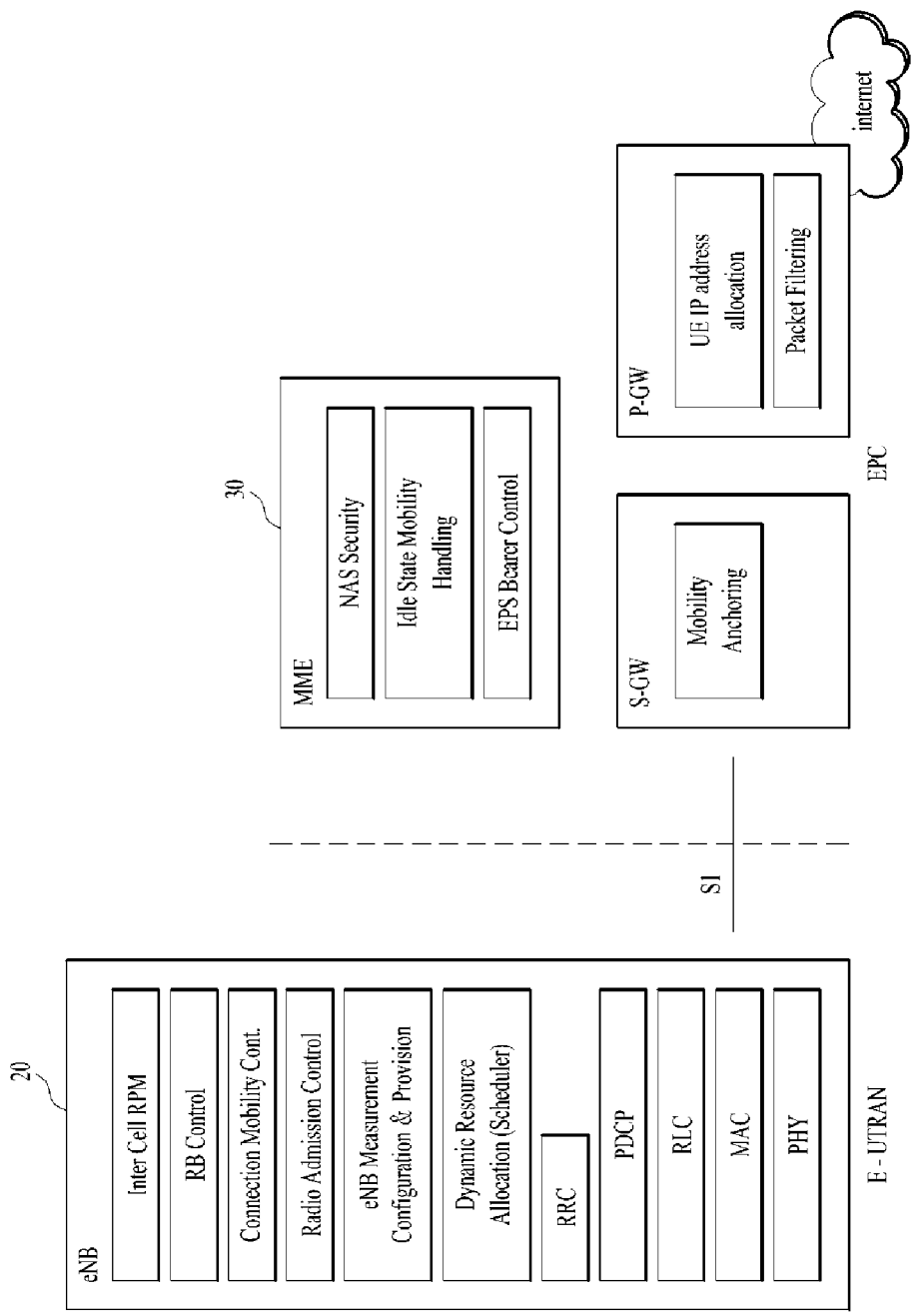

[Fig. 3]
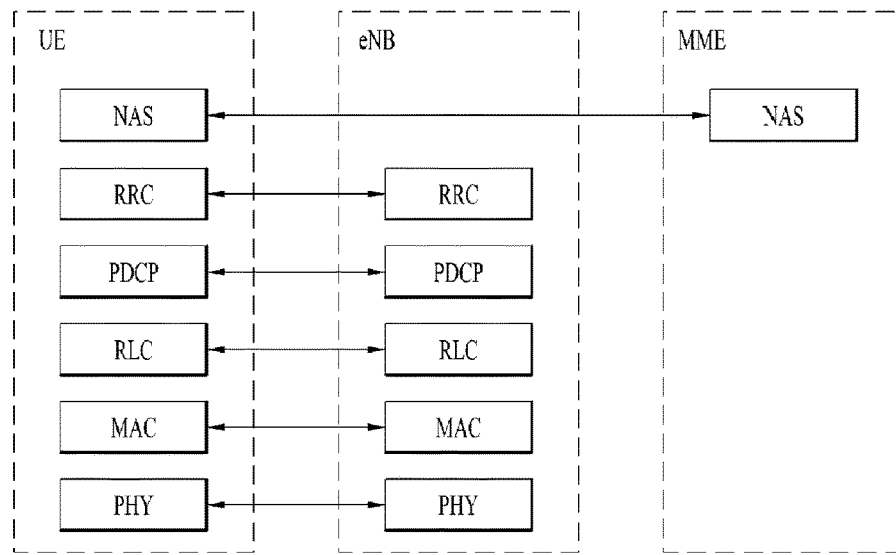
(a) Control-Plane Protocol Stack
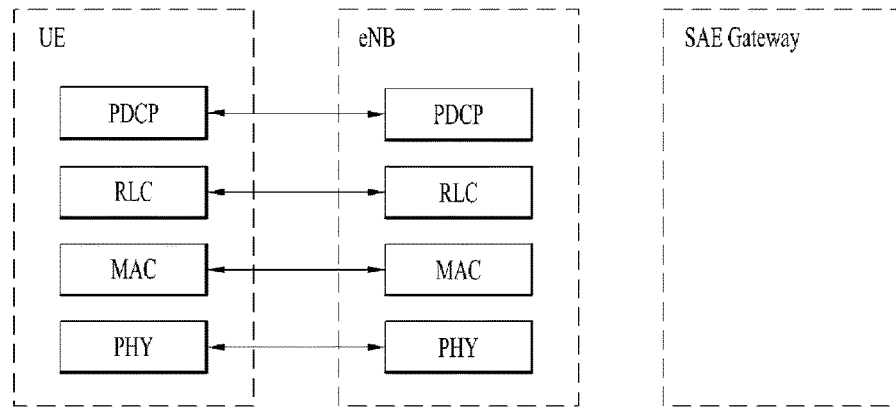
(b) User-Plane Protocol Stack
[Fig. 4]
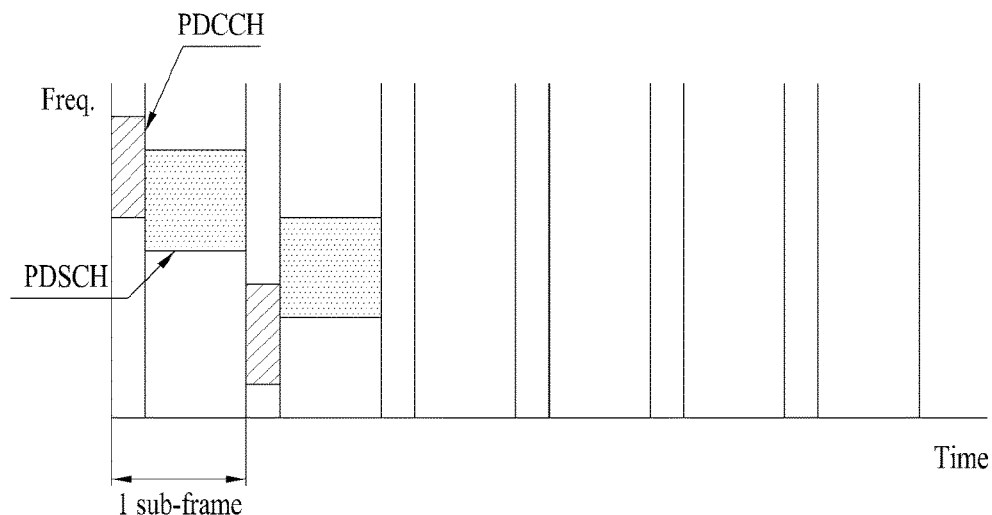

[Fig. 5]
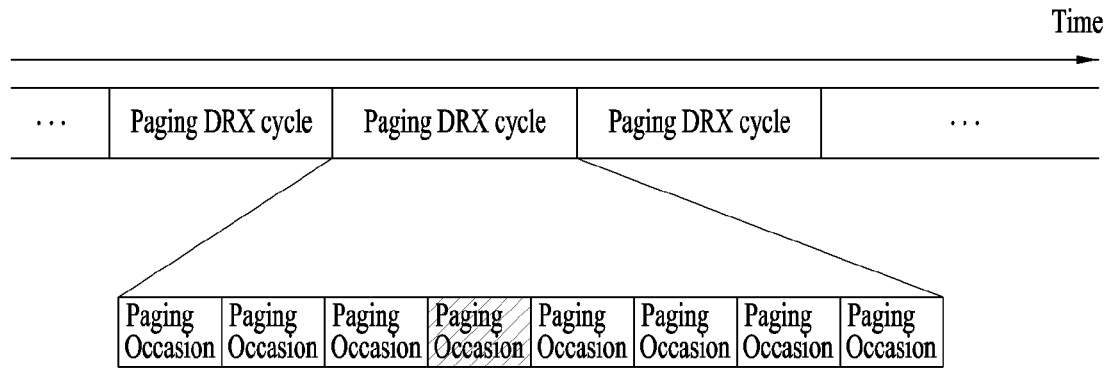
[Fig. 6]
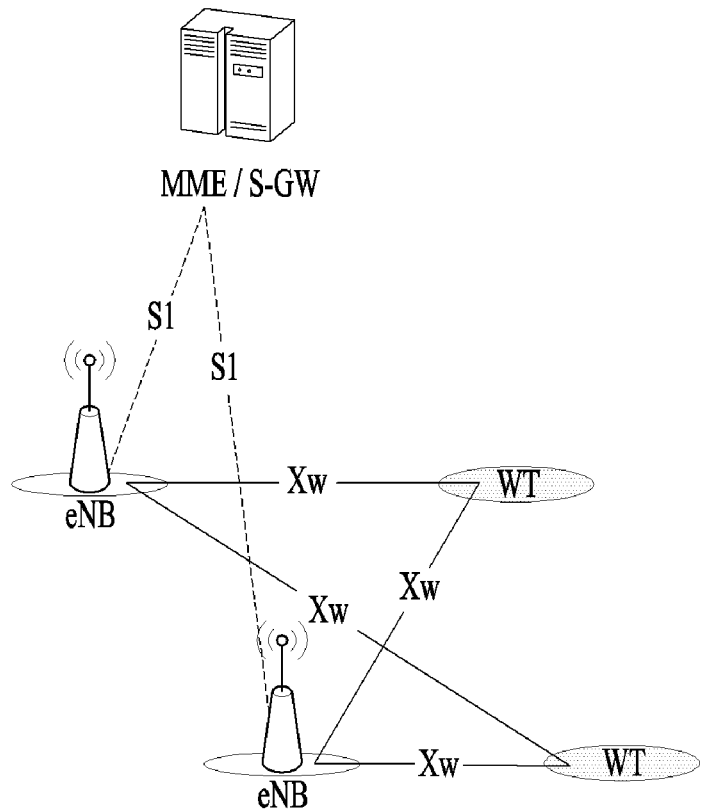

[Fig. 7]
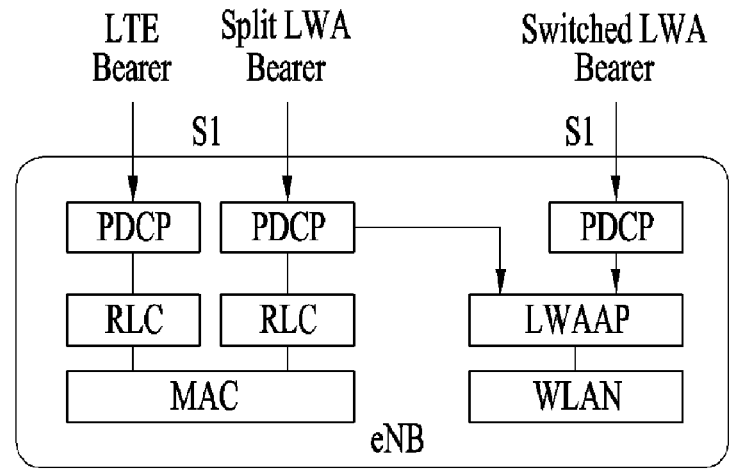
(a) Collocated scenario
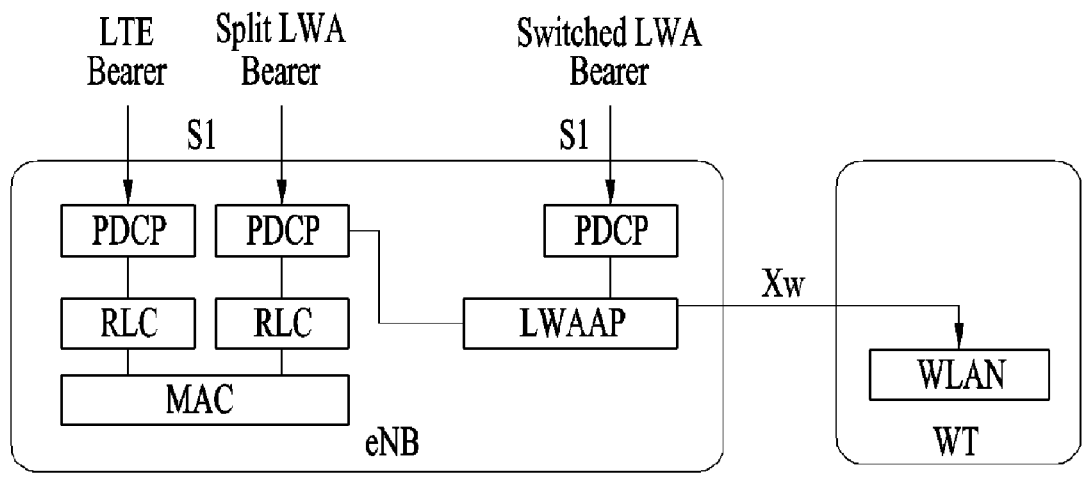
(b) Non-collocated scenario

[Fig. 8]
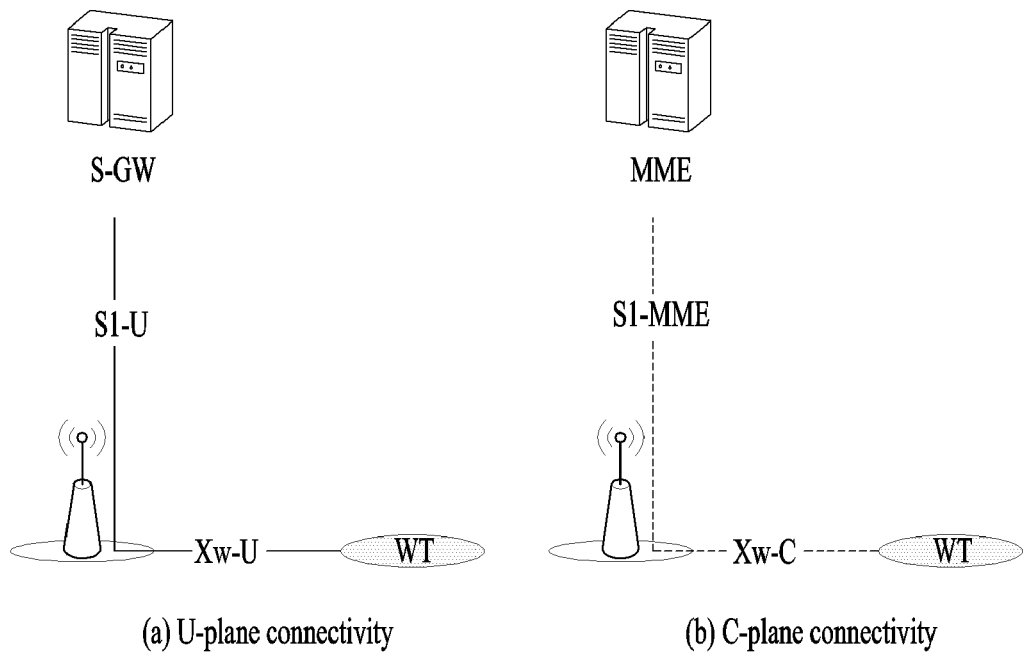
(a) U-plane connectivity     (b) C-plane connectivity

[Fig. 9]
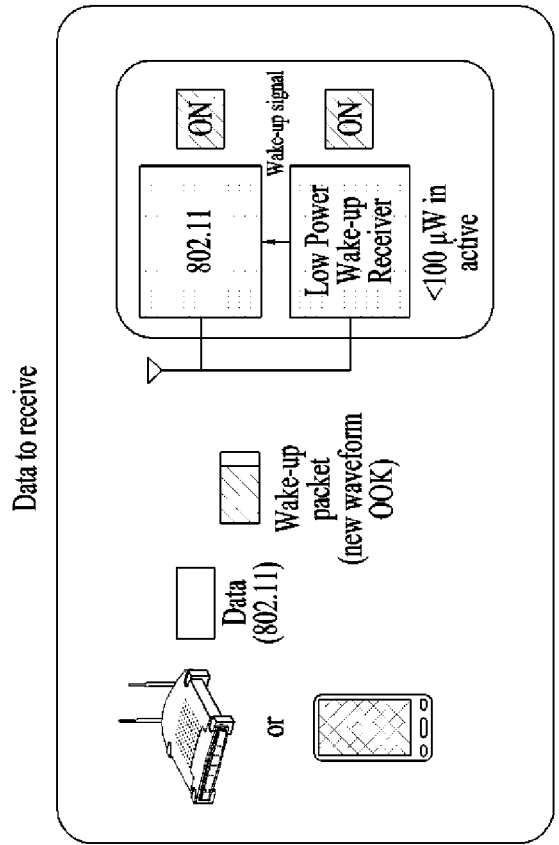
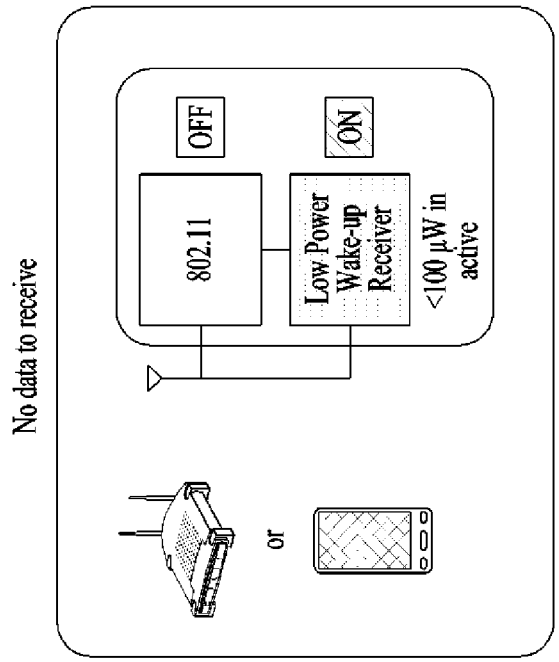

[Fig. 10]
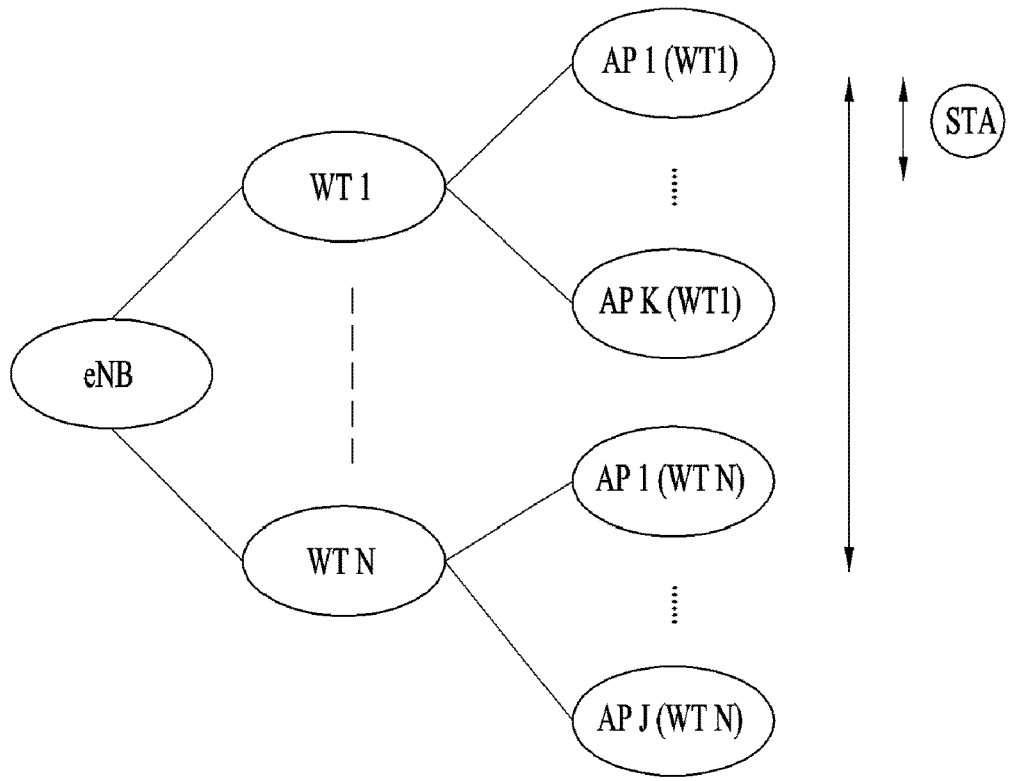
[Fig. 11]
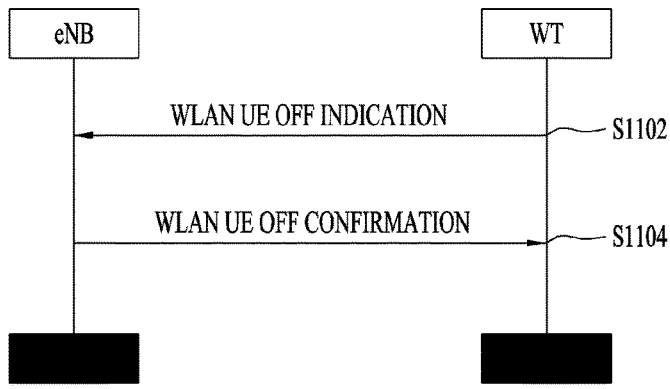
[Fig. 12]
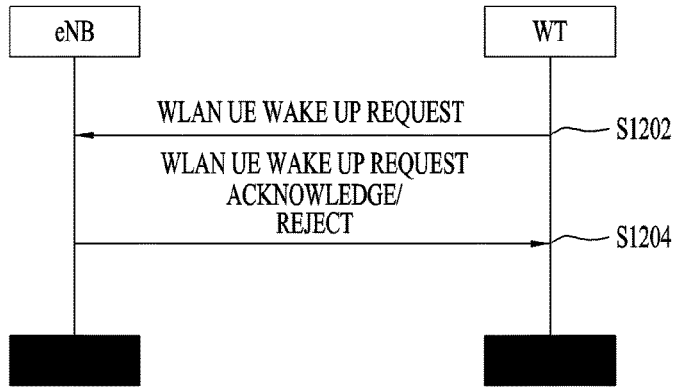

[Fig. 13]
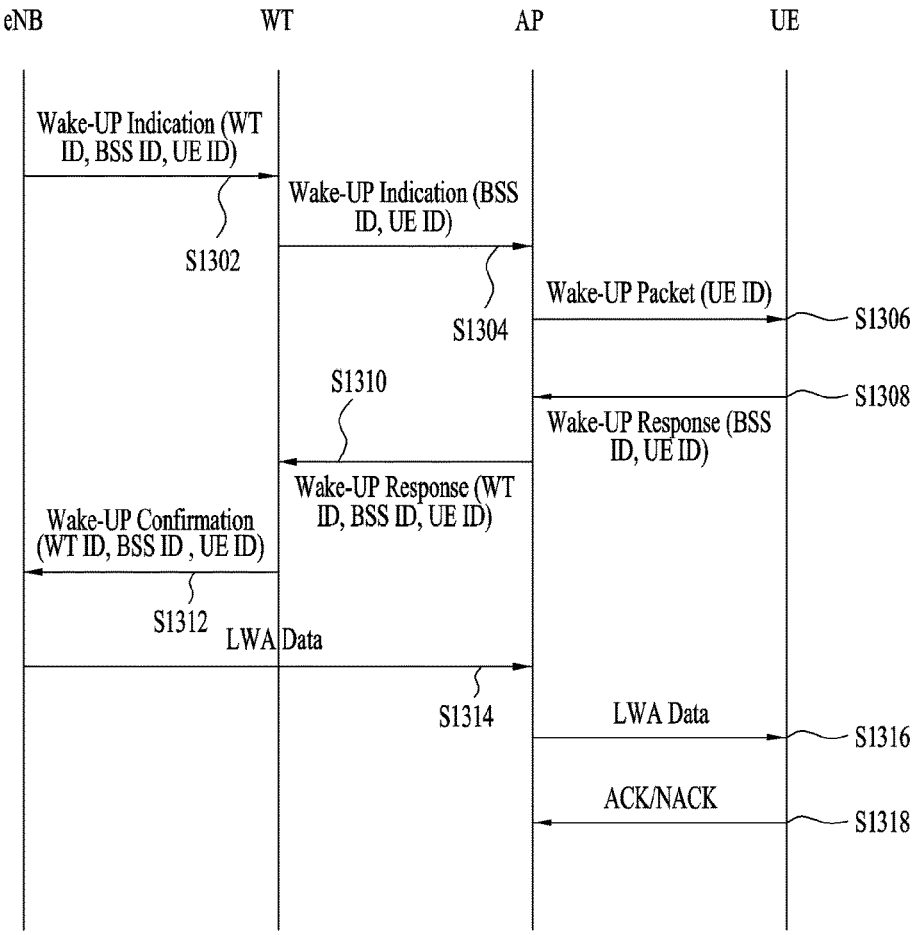
[Fig. 14]
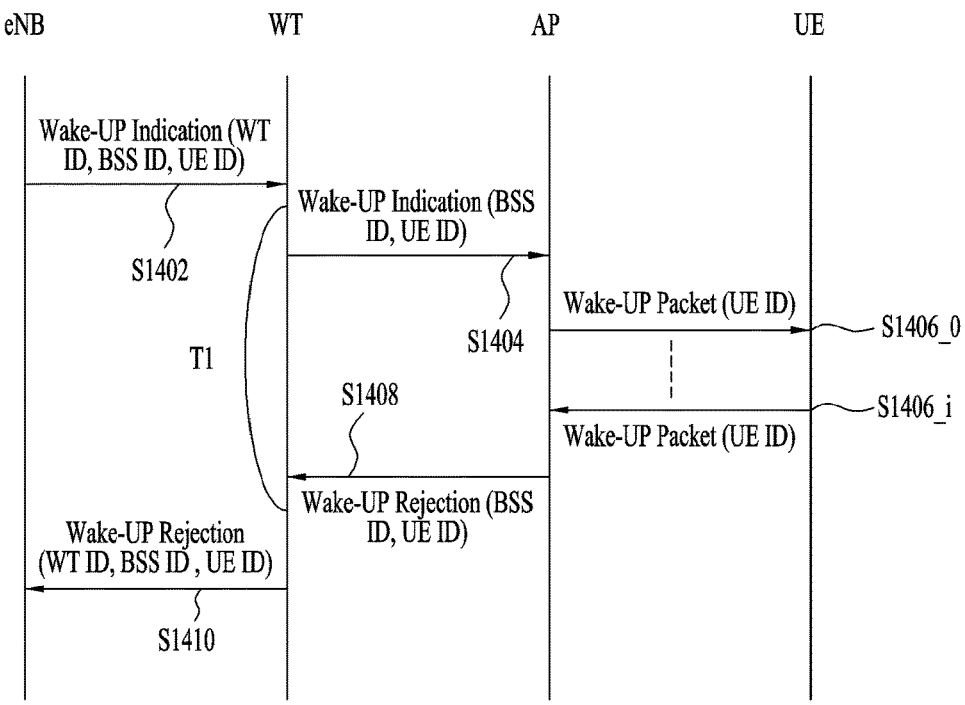

[Fig. 15]
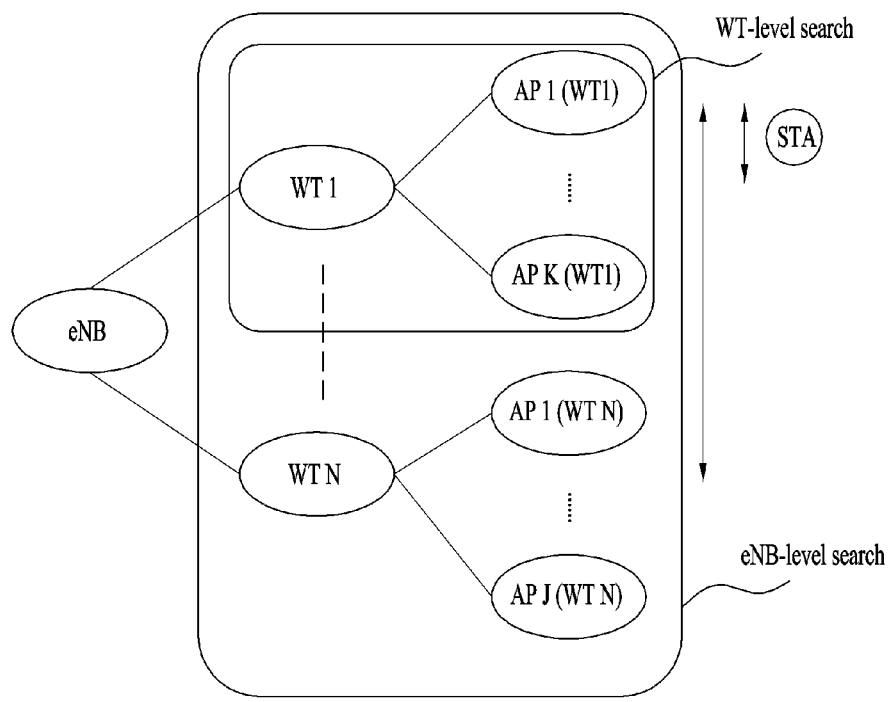

[Fig. 16]
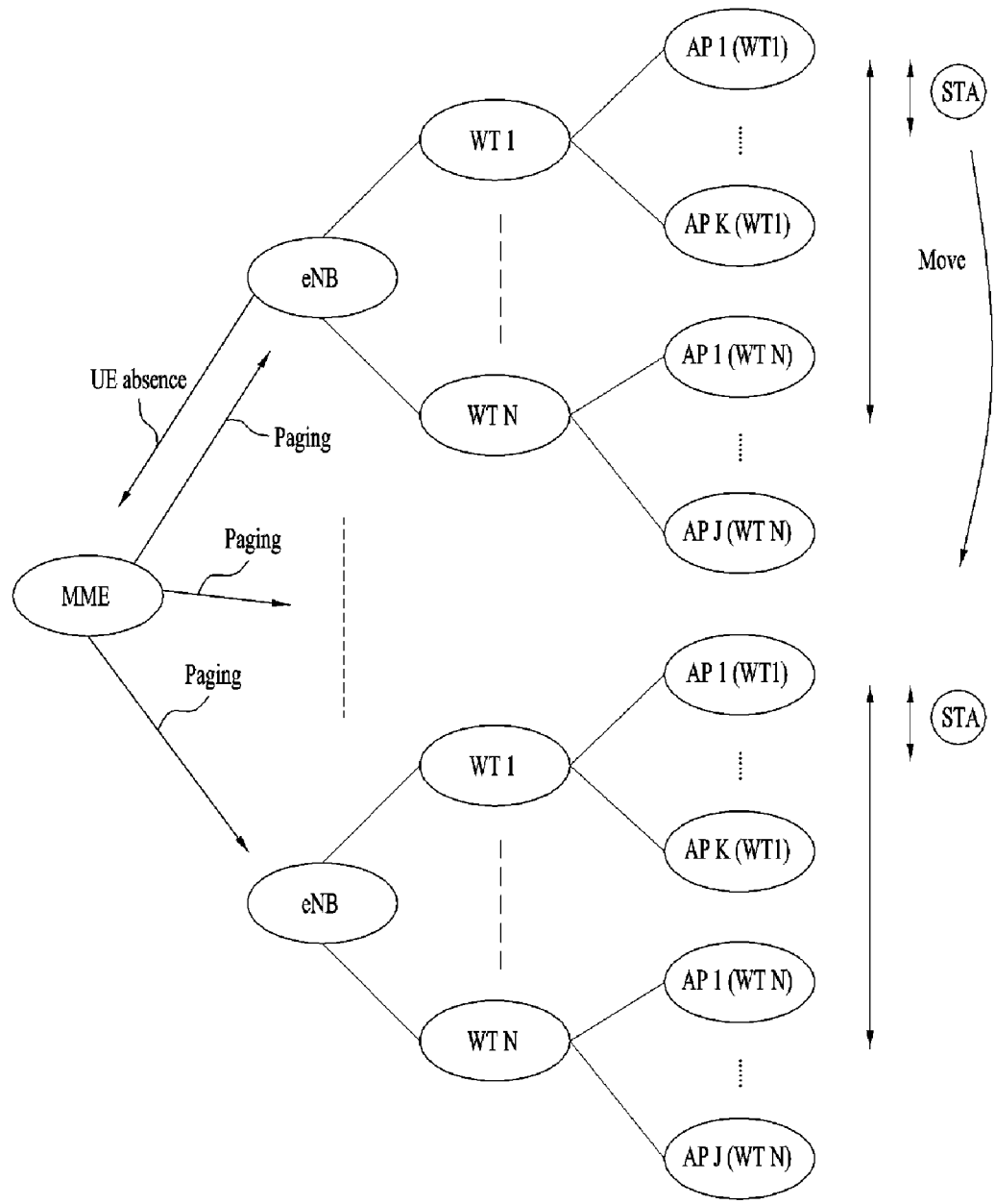

[Fig. 17]
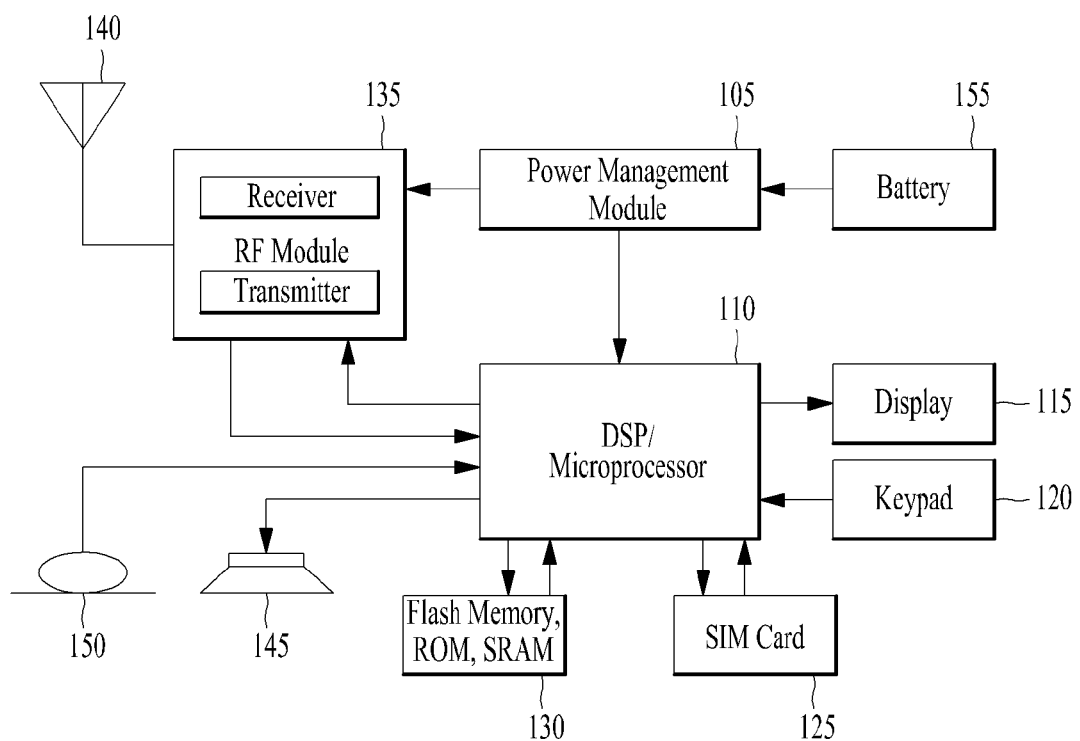

METHOD AND APPARATUS TO SUPPORT MOBILITY IN LWA

CROSS-REFERENCE TO RELATED APPLICATIONS

This application is a National Stage application under 35 U.S.C. § 371 of International Application No. PCT/KR2018/004614, filed on Apr. 20, 2018, which claims the benefit of U.S. Provisional Application No. 62/487,984, filed on Apr. 20, 2017. The disclosures of the prior applications are incorporated by reference in their entirety.

TECHNICAL FIELD

The present invention is directed to a method and an apparatus for use in a wireless communication system. Specifically, the present invention is directed to a method and an apparatus to support mobility in LTE WLAN Aggregation (LWA) with Wake-Up Radio (WUR).

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE OF INVENTION

Technical Problem

An object of the present invention is to provide a method and an apparatus of efficiently support mobility in LWA with WUR.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Solution to Problem

As an aspect of the invention, a method for a Base Station (BS) to support a mobility of a User Equipment (UE) with a Wake-Up Radio (WUR) function in a cellular communication system is provided. The method comprises: transmitting, to one of WLAN Terminations (WTs), a first indication to wake up WLAN module of the UE; if no response for the first indication is received from the one of WTs during a first time duration, transmitting, to all of the WTs, a second indication to wake up the WLAN module of the UE; and if no response for the second indication is received from any of the WTs during a second time duration, transmitting, to a mobility management entity (MME), a third indication related with absence of the UE.

As another aspect of the invention, a Base Station (BS) configured to support a mobility of a User Equipment (UE) with a Wake-Up Radio (WUR) function in a cellular communication system is provided. The BS comprises: a radio frequency (RF) unit; and a processor, wherein the processor is configured to: transmit, to one of WLAN Terminations (WTs), a first indication to wake up WLAN module of the UE, if no response for the first indication is received from the one of WTs during a first time duration, transmit, to all of the WTs, a second indication to wake up the WLAN module of the UE, and if no response for the second indication is received from any of the WTs during a second time duration, transmit, to a mobility management entity (MME), a third indication related with absence of the UE.

Preferably, the cellular communication system may be a 3rd Generation Partnership Project (3GPP)-based cellular communication system, and the WLAN module may be IEEE 802.11 module. The 3GPP-based cellular communication system may include 3GPP Lon-Tern Evolution (LTE)-based cellular communication system or 3GPP New Radio (NR)-based cellular communication system.

Preferably, the first and second indications may be transmitted through an Xw interface, and the third indication may be transmitted through an S1 interface of 3GPP LTE-based system or a NG interface of 3GPP NR-based system.

Preferably, the first indication may include WT ID, Basic Service Set (BSS) ID, and UE ID. Here, the UE ID may be Medium Access Control Identification (MAC ID) or Association Identification (AID).

Advantageous Effects of Invention

Exemplary embodiments of the present invention have the following effects. In accordance with the embodiments of the present invention, mobility in LWA with WUR can be efficiently supported.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is an example transmission of a paging channel used in an E-UMTS system;

FIG. 6 shows a LWA overall network architecture;

FIGS. 7(a) and 7(b) show LWA radio protocol architecture for collocated and non-collocated scenarios;

FIGS. 8(a) and 8(b) shows a user (U)-plane and control (C)-plane connectivities of eNB and WT, respectively;

FIG. 9 shows an overall description of WUR operation;

FIG. 10 shows a logical architecture considered in an example of the present invention;

FIG. 11 shows a procedure of WLAN UE Status Reporting;

FIG. 12 shows a procedure of WLAN UE Wake Up Request;

FIGS. 13~16 show exemplary signal flow diagrams according to examples of the present invention; and FIG. 17 illustrates a block diagram of a User Equipment (UE).

MODE FOR THE INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. 3GPP New Radio (NR) development is a part of continuous mobile broadband evolution process to meet the requirements of 5G as outlined by IMT-2020. 3GPP NR (simply, NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC).

Although the following embodiments of the present invention will hereinafter describe inventive technical characteristics on the basis of the 3GPP-based system (e.g., LTE/LTE-A/NR) system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.4, 3, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infras-tructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, standard institutes such as 3GPP or IEEE have proceeded to establish a D2D communication standard on the basis of LTE-A or Wi-Fi, and Qualcomm has developed their own D2D communication technology.

It is expected that D2D communication contributes to increase throughput of a mobile communication system and create new communication services. Also, D2D communication may support proximity based social network services or network game services. The problem of link of a user equipment located at a shade zone may be solved by using a D2D link as a relay. In this way, it is expected that the D2D technology will provide new services in various fields.

D2D communication technologies such as infrared communication, ZigBee, radio frequency identification (RFID) and near field communications (NFC) based on RFID have been already used. However, since these technologies support communication only of a specific object within a limited distance (about 1 m), it is difficult for the technologies to be strictly regarded as D2D communication technologies.

Although D2D communication has been described as above, details of a method for transmitting data from a plurality of D2D user equipments with the same resource have not been suggested.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network. The NR network has a similar architecture except that: (1) gNBs and ng-eNBs are interconnected with each other by means of an Xn interface, instead of the X1 interface, and (2) the gNBs and ng-eNBs are also connected by means of the NG interfaces to access and mobility management function (AMF)/user plane function (UPF), instead of the MME/SAE, by means of NG interface, instead of the S1 interface.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about con-nections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce un-necessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.4, 3, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

The NR system has a similar architecture to the LTE(-A) systems. Specifically, at both a UE and a gNB, a user plane protocol stack is composed by the PHY, the MAC, the RLC, the PDCP, and a new Service Data Adaptation Protocol (SDAP) layer. The SDAP handles flow-based Quality of Service (QoS) framework in RAN, such as mapping between QoS flow and a data radio bearer, and QoS flow ID markings. A control plane protocol stack is composed by the PHY, the MAC, the RLC, the PDCP, and the RRC. The NAS is used to convey non-radio signalling between the UE and an Access and Mobility Management Function (AMF). The AMF is similar to MME of LTE(-A) system, and connected to the UE through a N1 interface.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 illustrates an exemplary transmission of paging channel used in the E-UMTS system. UE in RRC IDLE mode uses Discontinuous Reception (DRX) in order to reduce power consumption. DRX cycle will determine how frequently UE will check for paging messages. DRX cycle is broadcast within System Information Block 2 (SIB2). It can have values of 32, 64, 128 or 256 radio frames. These corresponds to time intervals of 320, 640, 1280 and 2560 ms. The UE can also propose its own DRX cycle length within ATTACH REQUEST and TRACKING AREA UPDATE REQUEST messages. The set of allowed values are same as used in SIB2. To ac-complish the DRX, a network (e.g., eNB) constructs a number of paging occasions in each period of time, which is referred to as a "paging DRX cycle", and allows a specific UE to receive a specific paging occasion to obtain a paging message. Paging occasion (PO) is a subframe where there may be a Paging RNTI (P-RNTI) transmitted on a PDCCH addressing the paging message. Paging Frame (PF) is one radio frame, which may contain one or multiple Paging Occasion(s). UE does not need to check for all 1 ms subframes within its paging frames. A UE only needs to check the subframe identified by its paging occasion.

Paging frame occurs when following equation satisfies:

$$\text{SFN mod } T = (T/N) \times (\text{UE\_ID mod } N), \text{ where} \quad \text{[Equation 1]}$$

SFN is a super frame number (0~4095), which means an index of a radio frame,

T=DRX cycle length in radio frames,

N=Min (T, nB), which means the smaller one among T and nB, nB is broadcast within SIB2 and can have values of {4T, 2T, T, T/2, T/4, T/8, T/16, T/32}, N can have values of {T, T/2, T/4, T/8, T/16, T/32}, and UE_ID (UE Identity Index value)=International Mobile Subscriber Identity (IMSI) mod 1024.

In the paging frame, PO is defined as follows:

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Ns = max(1, nB/T), which means that Ns is the larger value between 1 and NB/T, and
i_s = Floor(UE_ID/N) mod Ns.

The UE receives a downlink channel every specified paging occasion. Specifically, at each paging occasion, the UE awakes to monitor a PDCCH. When the UE receives a Paging-RNTI (P-RNTI) corresponding to paging through the PDCCH, the UE receives a radio resource indicated by the PDCCH. An actual paging message is transmitted through a PDSCH using the radio resource. The UE receives the paging message and checks whether or not an identifier is identical to an identifier of the UE (i.e., an identifier such as an IMSI allocated to the UE) is present in the paging message. When an identical identifier is present, the UE transfer the paging message to an upper layer.

Example: Mobility in LWA with WUR

Tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets. New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate. The usage of unlicensed spectrum provides an attractive opportunity for operators to help support their subscribers by increasing network data capacity.

Recent research and development (R&D) and standardization efforts have been focused to aggregate heterogeneous LTE and LTE-Advanced networks, and wireless local area network (WLAN) so as to provide increased throughput using unlicensed spectrum and relieve congestion by off-loading of cellular data through WLAN. Two interworking features are defined in 3GPP: LTE WLAN Aggregation (LWA) and LTE WLAN Radio Level Integration with IPsec Tunnel (LWIP). In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN. In LWA, cellular operators have control on WLAN, while customers other than operators have the control of WLAN in LWIP.

Wake-up radio (WUR) is being considered in IEEE 802 community due to its much reduced power consumption when primary connectivity WLAN radio is expected inactive. In WUR, the main WLAN module is turned "OFF" and WUR receiver with much lower power consumption characteristics is "ON" and is waiting wake-up packet that indicates for WWUR receiver to wake the main WLAN module up.

To support WLAN devices with WUR capability in the context of LWA and LWIP, new signalling is required to deliver the status of WLAN modules in user equipment (UE) to eNB and wake-up signal to WLAN module before the data transmission from eNB.

Furthermore, it is highly probable that the UE with WLAN module and WUR capability is not in stationary. This implies that the locations of the UE during the "OFF" period of the main WLAN module can be handled by the different access points (APs). The AP into which UE is moved cannot know the presence of a new UE with WLAN and WUR capability, and thus there is no way to associate with the UE.

In the present invention, we propose method to support LWA and LWIP when WLAN module in UE has wake-up radio (WUR) capability and in motion.

Ample spectrum is a valuable resource to implement wireless broadband communications system. It is getting harder to harvest usable and empty spectrum to coup with ever increasing mobile data traffic. Aggregating licensed and unlicensed spectrums lies in natural line of thought since it can relieve spectrum congestion issue for some extent. $3^{rd}$ generation partnership project (3GPP) completed, in Release 13, the standardization of LTE WLAN Aggregation (LWA).

FIG. 6 shows a LWA overall network architecture in which a new logical interface, Xw, is defined between eNB and WLAN Termination (WT) for control and data. The WT terminates the Xw interface for WLAN. The WT handles multiple APs and forwards data to AP(s).

FIGS. 7(a) and 7(b) show LWA radio protocol architecture for collocated and non-collocated scenarios, respectively. In the non-collocated LWA scenario, the eNB is connected to one or more WTs via an Xw interface. In the collocated LWA scenario, the interface between LTE and WLAN is up to implementation. For LWA, the only required interfaces to the Core Network are S1-U and S1-MME which are terminated at the eNB. No Core Network interface is required for the WLAN.

In LWA, a radio protocol architecture that a particular bearer uses depends on the LWA backhaul scenario and how the bearer is set up. Two bearer types exist for LWA: split LWA bearer and switched LWA bearer. For PDUs sent over WLAN in LWA operation, the LTE-WLAN Aggregation Adaptation Protocol (LWAAP) entity generates LWAAP PDU containing a dedicated radio bearer (DRB) identity, and the WT uses the LWA EtherType 0x9E65 for forwarding the data to the UE over WLAN. The UE uses the LWA EtherType to determine that the received PDU belongs to an LWA bearer and uses the DRB identity to determine to which LWA bearer the PDU belongs to. In the downlink, the PDCP sublayer of the UE supports in-sequence delivery of upper layer PDUs based on the reordering procedure introduced for Dual Connectivity (DC). In the uplink, PDCP PDUs can only be sent via the LTE. The UE supporting LWA may be configured by the eNB to send PDCP status report or LWA status report, in cases where feedback from WT is not available. Only RLC AM can be configured for an LWA bearer. E-UTRAN does not configure LWA with DC, LWIP or RAN Controlled LTE-WLAN Interworking (RCLWI) simultaneously for the same UE. If LWA and RAN assisted WLAN interworking are simultaneously configured for the same UE, in RRC Connected, the UE only applies LWA. In the non-collocated LWA scenario, Xw interface is defined between eNB and WT.

FIG. 8(a) shows a user (U)-plane connectivity of eNB and WT involved in LWA for a certain UE: S1-U terminats at the eNB; the eNB and the WT are interconnected via Xw user-plane (Xw-U) interface. For LWA, if Xw-U user data bearers are associated with E-RABs for which the LWA bearer option is configured, the user plane data is transferred from eNB to WT using the Xw-U interface. The Xw-U interface is used to deliver LWAAP PDUs between eNB and WT. The Xw-U interface supports flow control based on feedback from WT. The Flow Control function is applied in the downlink when an E-RAB is mapped onto an LWA bearer, i.e. the flow control information is provided by the WT to the eNB for the eNB to control the downlink user data flow to the WT for the LWA bearer. eNB-WT control plane signalling for LWA is performed by means of Xw control-plane (Xw-C) interface signalling. FIG. 8(b) shows a control (C)-plane connectivity of eNB and WT involved in LWA for a certain UE: S1-MME terminates in eNB; the eNB and the WT are interconnected via Xw-C interface. There is only one S1-MME connection per LWA UE between the eNB and the MME. Respective coordination between eNB and WT is performed by means of Xw interface signalling.

The application layer signalling protocol is referred to as Xw Application Protocol (Xw-AP). The Xw-AP protocol supports the following functions:
 Transfer of WLAN metrics (e.g. Basic Service Set (BSS) load) from WT to eNB;
 Support of LWA for UE in EPS Connection Management (ECM)-CONNECTED:
 Establishment, Modification and Release of a UE context at the WT;
 Control of user plane tunnels between eNB and WT for a specific UE for LWA bearers.
 General Xw management and error handling functions:
 Error indication;
 Setting up the Xw;
 Resetting the Xw;
 Updating the WT configuration data.

WUR technology is one of the green technologies since it can prevent the waste of power when it is not necessarily required. FIG. 9 shows an overall description of WUR operation. Referring to FIG. 9, WLAN module (IEEE 802.11 module) will totally be turned off when no data is transmitted and received (this status is called "OFF" in which 801.11 module is off but WUR module is on). If there is the data for UE with specific WLAN module identity, e.g. medium-access control identification (MAC ID), association identification (AID), then access point (AP) sends "wake-up" signal (or packet) to it before actual data is delivered. Wake-up receiver in UE keeps looking for the presence of wake-up signal coming and, if it is detected, then WLAN module will be waken up. The length of WLAN module "OFF" period conceived in WUR will be much longer than that of sleep-mode currently defined and thus much power can be saved.

Current specifications on LWA and LWIP do not support WUR WLAN func-tionality. In order to address the problem, the present invention proposes a method to support UE with WUR capability in the context of LWA and LWIP. The present invention introduces methods and signalling even to support mobility. If WUR comes in LWA, the WT may notify eNB that a served terminal has WUR, and eNB may ask WT to wake up the terminal through the related AP. It is assumed that LTE module in UE can also wake up WLAN module in addition to WUR's capability to wake up WLAN module.

FIG. 10 shows a logical architecture considered in an example of the present invention. It is assumed that eNB, WT, AP and UE (WLAN terminal, STA) support WUR.

Referring to FIG. 10, an eNB manages multiple WTs and, in turn, a WT manages multiple APs. STA may move around within APs managed by a WT or move across different WTs. It is assumed that the eNB is associated with an intended WLAN UE (hereinafter simply, intended UE). The "association" means that a BSS (e.g., AP) (which belong to the eNB's mobile network operator (MNO) as an example) and the UE are associated. In order to manage status of UE, WLAN UE Status Reporting can be performed. Specifically, each BSS (e.g., AP 1~J) may gather status information of UE(s) under its control regarding "OFF" (i.e., IEEE 801.11 module is OFF but WUR module is ON) status. Then, each BSS may deliver the gathered status information to the eNB via a respective WT (e.g., WT 1~N) (protocol can be or is not terminated at WT). After receiving the status information, the eNB knows which UE is in "OFF" status. And, when the eNB has LWA traffic (e.g., downward traffic toward WLAN UE), the eNB may initiate a procedure to wake up IEEE 802.11 module of an intended UE.

FIG. 11 shows a procedure of WLAN UE Status Reporting. In the structure of FIG. 10, each WT (e.g., WT 1~N) may transmit WLAN UE OFF INDICATION (simply, Off Indication) to an eNB (S1102) using Xw-AP (Uplink Control Plane). The Off Indication may contain status information about related/associated UE is in OFF status. For example, the status information may also include information, such as UE ID (e.g., MAC ID and/or AID), BSS ID (e.g., AP's MAC ID of 48 bits) to which the UE belongs, and WT ID to which the AP with the BSS ID belongs. The status information may be first gathered by BSS(s) under each WT, and then the BSS(s) informs a controlling WT of the gathered status information. If more than one eNB is associated with WT, the Off Indication may include eNB ID. As a response to the Off Indication, the eNB may transmit WLAN UE OFF CONFIRMATION (simply, Off Confirmation) to each WT (S1104). The Off Confirmation may include eNB ID (optionally, if more than one eNB is associated with WT) and WT ID.

FIG. 12 shows a procedure of WLAN UE Wake Up Request. When an eNB has LWA traffic (e.g., downward traffic toward WLAN UE), the eNB may transmit WLAN UE WAKE-UP REQUEST (simply, Wake-Up Request or Wake-Up Indication) to an intended WT (S1202). The Wake-Up Request may include eNB ID (optionally, if more than one eNB is associated with WT), WT ID, BSS ID (e.g., AP's MAC ID of 48 bits) and UE ID (e.g., MAC ID or AID), with regard to the intended UE. After the Wake-Up Request is transmitted, a procedure of waking-up IEEE 802.11 module of an intended UE is accompanied, which will be explained referring to FIGS. 13-14. As a result, if the intended UE gets awaken, it's said to be "successful"; otherwise (e.g, there is no positive response (i.e., success)), it's said to be "un-successful" (or "failure"). And, the intended WT may transmit WLAN UE WAKE-UP REQUEST ACKNOWLEDGE (simply, Wake-Up Success) or WLAN UE WAKE-UP REQUEST REJECT (simply, Wake-Up Reject) to the eNB. The Wake-Up Success/Reject may include eNB ID (optionally, if more than one eNB is associated with WT), WT ID, BSS ID (e.g., AP's MAC ID of 48 bits) and UE ID (e.g., MAC ID or AID), with regard to the intended UE.

FIG. 13 shows an exemplary signal flow diagram according to an example of the present invention. This example shows a case that an UE moves within a range of a previously associated AP. Detailed signal flows are performed as follows (hereinafter, procedure 1).

[Step 1] When an eNB has LWA traffic (e.g., downward traffic toward WLAN UE), eNB may check whether the intended UE is in OFF state (based on WT's status report (see, FIG. 11). If the intended UE is in OFF state, the eNB may send wake-up indication (e.g., FIG. 12, Wake-Up Request or Wake-Up Indication) with (WT ID, BSS ID (e.g., AP's MAC ID of 48 bits) and UE ID (e.g., MAC ID or AID), which are related/associated with the intended UE) to WT (to which the intended UE's BSS belongs) via Xw-AP (Downlink Control Plane). (S1302).

[Step 2] The WT that received this wake-up indication (from eNB) may (1) look up the received BSS information/ID (e.g., AP's MAC ID of 48 bits), (2) process the received wake-up indication (e.g., delete WT ID), and (3) deliver the processed wake-up indication with the BSS ID (e.g., AP's MAC ID of 48 bits) and the UE ID (e.g., MAC ID or AID) to an AP with the BSS ID (S1304).

[Step 3] The AP may compose a wake-up packet (i.e., WUR packet/signal) for the intended UE with the UE ID and send the wake-up packet to the intended UE with the UE ID (S1306). When no response is received from the intended UE for a certain time interval, the AP can repeat the wake-up packet transmission multiple times.

[Step 4] If the intended UE receives the wake-up packet from the AP, the intended UE may wake up (i.e., turn on) its WLAN module, and the WLAN module may initiate authentication/association procedure with the AP. Then the intended UE may also send a wake-up response (i.e., successful) with BSS ID (e.g., AP's MAC ID of 48 bits) and UE ID (e.g., MAC ID or AID) to the AP with the BSS ID (S1308). Success of the authentication/association procedure may implicitly play a role of the wake-up response. Thus the wake-up response (i.e., successful) can be replaced with the success of the authentication/association procedure.

[Step 5] If the AP receives the wake-up response from the intended UE (or, if the au-thentication/association procedure is successful), the AP may transmit a wake-up response including updated UE status (e.g., 802.11 module of the intended UE is in ON mode) to a controlling WT. The wake-up response of the AP may include the BSS ID (e.g., AP's MAC ID of 48 bits), the UE ID (e.g., MAC ID or AID), etc. (S1310).

[Step 6] The WT that received the wake-up response including the updated UE status from AP may transmit an Off Confirmation including the received UE status to the eNB. The Off Confirmation may also include the WT ID, the BSS ID (e.g., AP's MAC ID of 48 bits), the UE ID (e.g., MAC ID or AID), etc. (S1312).

[Step 7] After receiving the updated UE status, the eNB may change/update the stored UE status information (e.g., from "OFF" to "ON"), and begin to send LWA traffic to an AP using Xw-AP (Downlink Data Plane) (S1314).

[Step 8] The AP may deliver the LWA traffic of S1314 to the intended UE (S1316).

[Step 9] The intended UE may send ACK/NACK about the received LWA traffic to the AP (S1318).

FIG. 14 shows another exemplary signal flow diagram according to an example of the present invention. This example shows a case that an UE moves out of an associated AP, and move around within APs managed by a WT or move across different WTs/eNBs. Detailed signal flows are performed as follows.

[Step 1] When an eNB has LWA traffic (e.g., downward traffic toward WLAN UE), eNB may check whether the intended UE is in OFF state (based on WT's status report (see, FIG. 11). If the intended UE is in OFF state, the eNB may send wake-up indication (e.g., FIG. 12, Wake-Up Request or Wake-Up Indication) with (WT ID, BSS ID (e.g., AP's MAC ID of 48 bits) and UE ID (e.g., MAC ID or AID), which are related/associated with the intended UE. to WT (to which the intended UE's BSS belongs)(e.g., WT 1 in FIG. 10) via Xw-AP (Downlink Control Plane) (S1402).

[Step 2] The WT (e.g., WT 1 in FIG. 10) that received this wake-up indication (from eNB) may (1) look up the received BSS information/ID (e.g., AP's MAC ID of 48 bits), (2) process the received wake-up indication (e.g., delete WT ID), and (3) deliver the processed wake-up indication with the BSS ID (e.g., AP's MAC ID of 48 bits) and the UE ID (e.g., MAC ID or AID) to an AP with the BSS ID (S1404) (e.g., AP 1 (WT 1) in FIG. 10).

[Step 3] The AP (e.g., AP 1 (WT 1) in FIG. 10) may compose a wake-up packet (i.e., WUR packet/signal) for the intended UE with the UE ID and send the wake-up packet to the intended UE with the UE ID (S1406_0). When no response is received from the intended UE for a certain time interval, the AP (e.g., AP 1 (WT 1) in FIG. 10) can repeat the wake-up packet transmission multiple times (S1406_1~S1406_i).

[Step 4] When no response (i.e., not found) is received by a delivering AP (e.g., AP 1 (WT 1) in FIG. 10) after one or more wake-up packet transmissions with UE ID (S1406_0~S1406_i), the AP may transmit Wake-Up Rejection for reporting the absence of the intended UE to the WT (e.g., WT 1 in FIG. 10) (i.e., "not found within the range of this AP") (S1408).

When Wake-Up Rejection (i.e., UE's absence) or no positive response is received by the WT (e.g., WT 1 in FIG. 10) from the AP (e.g., AP 1 (WT 1) in FIG. 10) for a certain time duration (T1), the WT may also transmit Wake-Up Rejection for reporting the absence of the intended UE to the eNB (S1410).

After the procedure of FIG. 14, two methods can be considered, in order to find the intended UE and transmit LWA traffic to it. In the methods, it is assumed that the intended UE may have a preference setting (PREF setting), e.g., whether or not, the intended UE prefers to receive user data (UP traffic) via WLAN (e.g., primarily (i) via WLAN or (ii) via E-UTRA, LTE or NR). FIGS. 15-16 are diagrams for explaining the two methods. FIG. 15 shows a two-level search for finding an intended UE, where WT-level search is firstly performed, and then eNB-level search is performed. FIG. 16 shows a procedure of using a paging to find the intended UE.

Method 1

[Step a][WT's action] (As a result of Step 4 of FIG. 14) If the WT (e.g., WT 1) has control of more than one AP, then the WT delivers multicast/broadcast wake-up request with UE ID to multiple APs (e.g., APs (WT 1)), and go to Step a.1 (See, WT-level search of FIG. 15). Otherwise (i.e., if the WT has only one AP (e.g., AP 1 (WT 1))), go to Step d.

[Step a.1][AP's action] If multiple APs (e.g., APs (WT 1)) receive a (new) "wake-up request with UE ID" from the WT (e.g., WT 1), each AP may perform Steps 3 and 4 of FIGS. 13-14. Meanwhile, if an AP (e.g., AP X)(e.g., AP 1 (WT 1)), which already transmitted Wake-Up Rejection for reporting the absence of the intended UE to the WT (e.g., WT 1), receives the same "wake-up request with UE ID" from the same WT (e.g., WT 1) within a predefined period of time, AP X may (1) discard the same "wake-up request with UE ID", (2) skip Step 3 of FIGS. 13-14, and (3) send "Wake-Up Rejection with BSS ID and UE ID" to the WT (e.g., WT 1) (See, WT-level search of FIG. 15).

[Step b] When no acknowledgement is received by the WT (e.g., WT 1) from any of APs (e.g., APs (WT 1)) under its control for a certain time duration (e.g., T1), the WT may send a Wake-Up Reject message to eNB. The Wake-Up Reject message may include eNB ID (optionally, if more than one eNB is associated with WT), WT ID, BSS ID and UE ID (See, WT-level search of FIG. 15).

[Step c] (In response to the outcome (i.e., Wake-Up Reject message) of Step b) the eNB may send Wake-Up indication with (WT ID, BSS ID (e.g., AP's MAC ID of 48 bits), UE ID (e.g., MAC ID or AID)) to multiple WTs (e.g., WT 1~N) under its control. Here, WT ID and BSS ID are multicast/broadcast ID. Each WT (e.g., WT i) delivers wake-up request to all APs (e.g., APs (WT i)) under its control (See, eNB-level search of FIG. 15).

[Step d] (when eNB has multiple WTs) When no response is received from any of WTs (e.g., WT 1~N) under its control for a certain time duration (e.g., T2), the eNB may report the absence of the intended UE to an MME (See, FIG. 16). The MME then composes a paging message and delivers it to multiple eNBs in a tracking area of the intended UE. Each of the multiple eNBs transmits the paging message to the intended UE (See, FIG. 16).

[Step e][UE's action] After receiving the paging message by LTE module in the intended UE, the intended UE may check PREF setting. [Case 1] if PREF=via WLAN, the intended UE's LTE module makes WLAN module waken up (WLAN module is already part of UE (in LWA feature)), and the WLAN module may initiate authentication and authorization procedures (i.e., begin association procedure) with new AP, in order to receive LWA traffic from an eNB. After the authentication and authorization procedures are completed, the new AP may transmit UE status (e.g., 802.11 module of the intended UE is in ON mode) to the eNB via a WT. After receiving the UE status, the eNB may change/update the stored UE status information (e.g., from "OFF" to "ON"), and begin to send LWA traffic to an AP using Xw-AP (Downlink Data Plane). Meanwhile, [Case 2] if PREF=via E-UTRA, LTE or NR, the intended UE's LTE module may perform a procedure to communicate an eNB in order to receive LWA traffic from the eNB, without awakening the WLAN module. In Case 2, if the intended UE is in RRC IDLE mode, the intended UE may perform an initial access to the eNB using a random access procedure. In this case, Access Class Barring/Application specific Congestion control for Data Communication (ACB/ACDC) or other access control schemes are configured, the intended UE may follow in-struction(s) provided by an eNB via SIB2. Meanwhile, if the intended UE is in RRC CONNECTED mode (including a case that the mode is changed from the RRC IDLE mode), the intended UE may (1) send a wake-up rejection directly to the eNB, and then (2) receive LWA traffic directly from the eNB via a downlink shared channel (e.g., PDSCH) in accordance with scheduling of the eNB.

Method 2

Method 2 is different from Method 1 in that if eNB recognizes that UE moves out of an associated AP, the eNB may report the absence of that UE to an MME, and perform a paging procedure to find and wake up the intended UE. Due to the differences, [Step a], [Step a.1], [Step b] and [Step c] are skipped in method 2. Detailed procedure is performed as follows. [eBN's action] when Wake-Up Rejection (i.e., UE's absence) or no positive response is received by eNB from WT (e.g., WT 1) for a certain time duration (e.g., T3) after Step 1 of FIG. 14 (S1402), the eNB may report the absence of the intended UE to an MME (See, FIG. 16). T3 may be set to be same as T1, or set to be different from T1. [MME's action, in response] MME then composes a paging message and delivers it to multiple eNBs. Each of the multiple eNBs transmits the paging message to the intended UE (See, FIG. 16). Then, [Step e] of Method 1 is performed according to the PREF setting of the UE.

Meanwhile, to save additional power, AP may support WUR capability too. In this case, the AP needs to be waken up before the data transmission to UE is initiated. To this end, Wake-Up indications can be directed from an eNB to an AP with BSS ID (e.g., MAC ID of the AP) before the procedure 1. It is assumed that the connection between WT and AP is wireless. Detailed procedure is performed as follows. First, the eNB may send wake-up indication to a WT with (WT ID, BSS ID (AP's MAC ID of 48 bits). If the WE receives the wake-up indication from the eNB, the WT may compose wake-up packet for the AP with BSS ID specified in the wake-up indication. The WT delivers the wake-up confirmation to the eNB with (WT ID, BSS ID (AP's MAC ID of 48 bits) after wake-up response is received from the AP. Then the eNB follows procedures of FIGS. 13-16.

In Methods 1 and 2, the paging procedure can be modified for WUR. For example, as shown in equation 1 and table 1, a normal paging procedure defines a paging frame and a paging occasion based on UE's IMSI. Also, in normal paging procedure, a presence of paging is indicated by a PDCCH, and a paging message is transmitted through a PDSCH. Meanwhile, for the purpose of the WUR, a paging frame and a paging occasion based on UE's MAC ID or AID. Also, in this case, a transmission of a paging message is not necessary, and so only a PDCCH scrambled with P-RNTI can be transmitted for the purpose of informing wake-up indication. Thus, if a UE supports WUR and if WLAN module of the UE is in OFF mode, the UE may monitor two sets of (PF, PO): one set is for a normal (e.g., LTE) paging procedure, and the other set is for WUR wake-up procedure. If the UE detects a PDCCH scrambled with P-RNTI in a set of (PF, PO) for the normal (e.g., LTE) paging procedure, the UE receives a paging message through a PDSCH. Meanwhile, the UE detects a PDCCH scrambled with P-RNTI in a set of (PF, PO) for the WUR wake-up procedure, the UE assumes that there is no PDSCH corresponding to the PDCCH, skips a procedure for receiving the PDCCH, and wakes up WLAN module to receive LWA traffic from an eNB.

FIG. 17 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a cellular communicating system supporting WUR.

The invention claimed is:

1. A method for a Base Station (BS) to support a mobility of a User Equipment (UE) with a Wake-Up Radio (WUR) function in a cellular communication system, the method comprising:
transmitting, to one of WLAN Terminations (WTs), a first indication to wake up WLAN module of the UE;
if no response for the first indication is received from the one of WTs during a first time duration, transmitting, to all of the WTs, a second indication to wake up the WLAN module of the UE; and
if no response for the second indication is received from any of the WTs during a second time duration, transmitting, to a mobility management entity (MME), a third indication related with absence of the UE.

2. The method of claim 1, wherein the cellular communication system is a 3rd Generation Partnership Project (3GPP)-based cellular communication system, and the WLAN module is IEEE 802.11 module.

3. The method of claim 2, wherein the first and second indications are transmitted through an Xw interface, and the third indication is transmitted through an S1 interface of 3GPP Long-Term Evolution (LTE)-based system or an NG interface of 3GPP New Radio (NR) system.

4. The method of claim 2, wherein the first indication includes WT ID, Basic Service Set (BSS) ID, and UE ID.

5. The method of claim 3, wherein the UE ID includes Medium Access Control Identification (MAC ID) or Association Identification (AID).

6. A Base Station (BS) configured to support a mobility of a User Equipment (UE) with a Wake-Up Radio (WUR) function in a cellular communication system, the BS comprising:
a radio frequency (RF) unit; and
a processor, wherein the processor is configured to:
transmit, to one of WLAN Terminations (WTs), a first indication to wake up WLAN module of the UE,
if no response for the first indication is received from the one of WTs during a first time duration, transmit, to all of the WTs, a second indication to wake up the WLAN module of the UE, and
if no response for the second indication is received from any of the WTs during a second time duration, transmit, to a mobility management entity (MME), a third indication related with absence of the UE.

7. The BS of claim 6, wherein the cellular communication system is a 3rd Generation Partnership Project (3GPP)-based cellular communication system, and the WLAN module is IEEE 802.11 module.

8. The BS of claim 7, wherein the first and second indications are transmitted through an Xw interface, and the third indication is transmitted through an S1 interface of 3GPP Long-Term Evolution (LTE)-based system or an NG interface of 3GPP New Radio (NR) system.

9. The BS of claim 7, wherein the first indication includes WT ID, Basic Service Set (BSS) ID, and UE ID.

10. The BS of claim 8, wherein the UE ID includes Medium Access Control Identification (MAC ID) or Association Identification (AID).

* * * * *